L. W. LYONS & J. WILLS.
ROLLER BEARING.
APPLICATION FILED APR. 4, 1918.
1,296,827.
Patented Mar. 11, 1919.
2 SHEETS—SHEET 1.
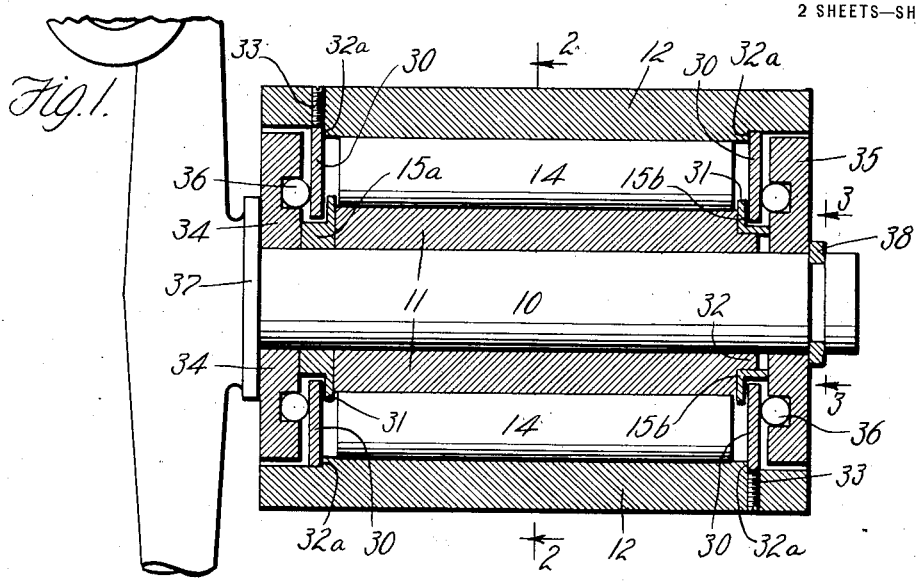
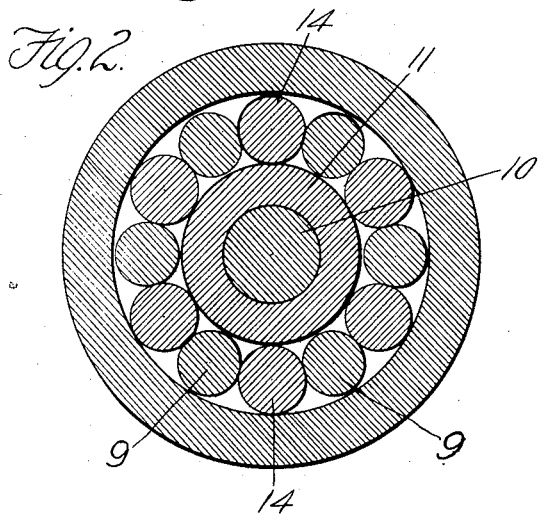
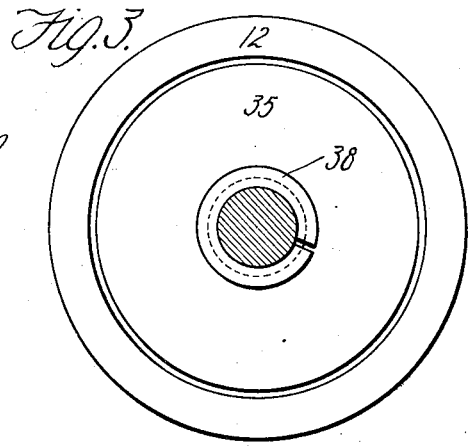
Inventors
Lowell W. Lyons and
Joseph Wills,
by James T. Van ....
their Attorney

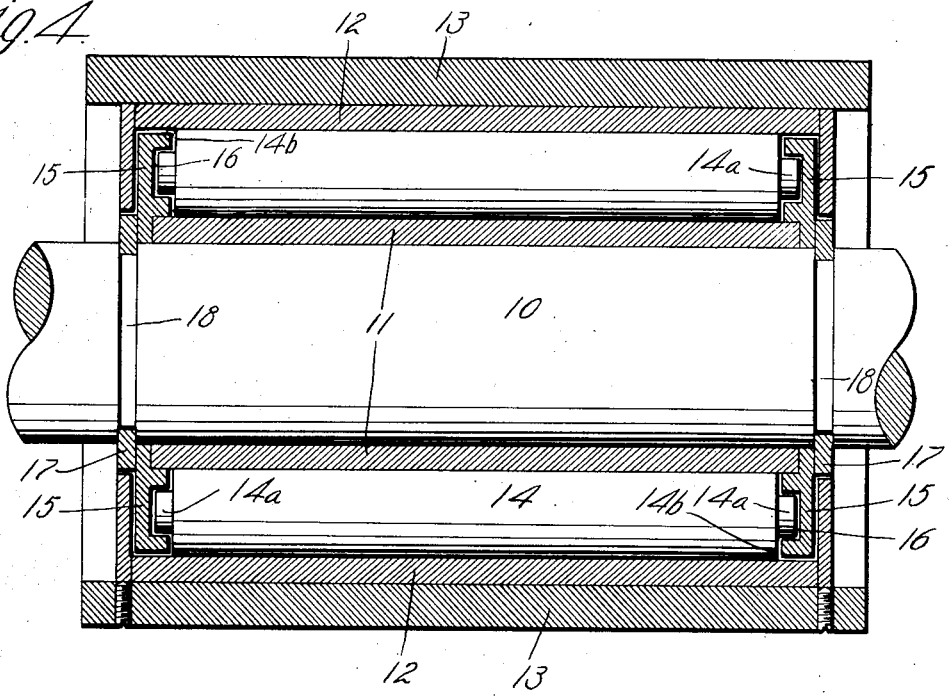
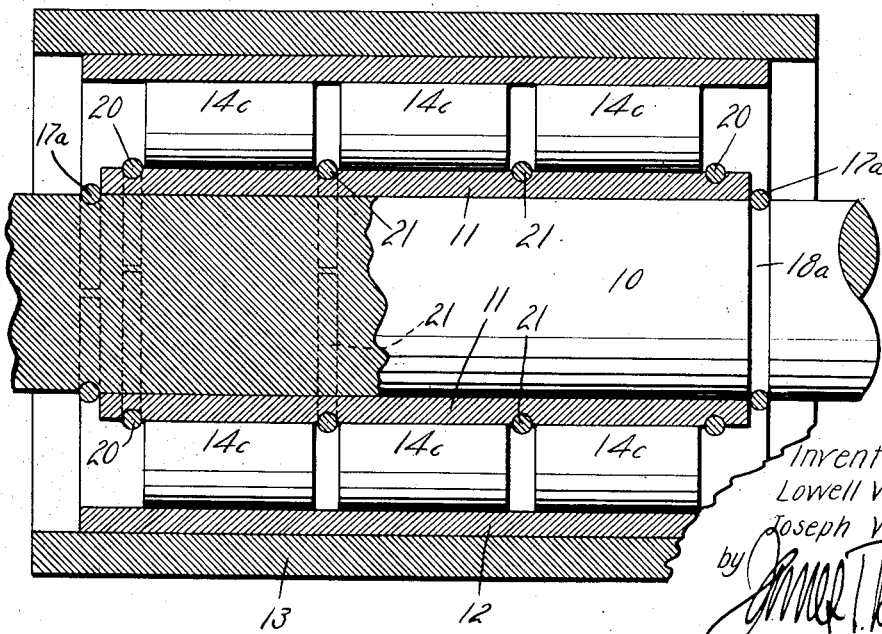

UNITED STATES PATENT OFFICE.

LOWELL W. LYONS AND JOSEPH WILLS, OF LOS ANGELES, CALIFORNIA; SAID WILLS ASSIGNOR TO SAID LYONS.

ROLLER-BEARING.

1,296,827.  Specification of Letters Patent.  Patented Mar. 11, 1919.

Application filed April 4, 1918. Serial No. 226,608.

*To all whom it may concern:*

Be it known that we, LOWELL W. LYONS and JOSEPH WILLS, citizens of the United States, residing at Los Angeles, in the county of Los Angeles, State of California, have invented new and useful Improvements in Roller-Bearings, of which the following is a specification.

This invention relates to roller bearings in general; and although it is illustrated and described particularly with relation to that type of roller bearing in which spacing rollers are used of smaller diameter than the load carrying rollers, substituting rolling for sliding friction between the load carrying rollers, and obviating the use of a cage or other guide means for the load carrying rollers; yet it will be understood that our invention is applicable to any other form and arrangement of the rollers.

The invention herein concerned embodies fundamentally, and is based upon, the use of a sleeve—a removable sleeve (preferably—placed upon the inner member or shaft of the bearing and providing the cylindrical rolling surface for the rollers. It is an object of this invention to provide a roller bearing simply and economically manufactured and highly efficient in use; and which may be adapted, by changes efficient and economical in their nature, to varying conditions and various uses. How the invention accomplishes these and other objects will be best understood from a detailed description of preferred forms of roller bearings embodying the invention; reference being had for this purpose to the accompanying drawings in which—

Figure 1 is a longitudinal central section of a preferred form of bearing adapted particularly to a specific use, hereinafter explained; Fig. 2 is a cross section taken on line 2—2 of Fig. 1; Fig. 3 is a cross section taken on line 3—3 of Fig. 1; Fig. 4 is a longitudinal section of another and simpler form of bearing; and Fig. 5 is a longitudinal section of another simple form of bearing.

We shall first advert to the general features of our improved bearing; explaining the utility and advantages gained by the use of the sleeve construction and indicating some of the forms and arrangements which may be adopted for that construction; and then we will explain a typical specific arrangement of the device as applied to a particular use.

In each form of the bearing there is an inner bearing member or shaft 10, carrying bearing sleeve 11. This bearing sleeve 11, in a simple form of this device, may preferably be a comparatively thin sleeve of drawn metal—a piece of drawn metal tubing—preferably removably fitted upon the shaft 10. The outer member of the bearing may also be formed by a similar sleeve if so desired. In Figs. 4 and 5 we show an outer bearing sleeve 12 fitted within outer member 13 of the bearing. These two sleeves 11 and 12, or other corresponding members, form the actual cylindrical rolling surfaces for the load carrying rollers 14. Generally speaking, our construction in any of its forms involves this advantage: that the sleeves may easily be formed of tubular metal, a proper length of the tube being cut off and put in place upon the shaft without the necessity of machining. The sleeve or sleeves may thus be easily renewed whenever desired.

Referring now more particularly to Fig. 4 of the drawings, we show one preferred means of holding the sleeve 11 upon shaft 10 and at the same time of limiting endwise movement of rollers 14. In Fig. 4 we show a peculiar form of rollers with reduced ends 14$^a$ and accordingly we show roller confining collars 15 having annular grooves 16 into which the reduced ends 14$^a$ project; and the construction is such that the ends of the reduced portions 14$^a$ strike the bottoms of the grooves 16 at the same time that the shouldered ends 14$^b$ of the rollers strike the face of collar 15. We show this particular form of roller to indicate how our invention may be used with various different forms of rollers. Collars 15 are held against the ends of sleeve 11 by any suitable means; and we have illustrated in the drawings holding means comprising split spring rings 17 laid in annular grooves 18 in the shaft 10. These split spring rings hold collar 15 up against the ends of sleeve 11, holding the sleeve 11 in place on the shaft and also holding the collars in position to limit endwise movement of the rollers.

In Fig. 5 we illustrate a form of bearing which shows how the use of a bearing sleeve or sleeves facilitates other features of our roller bearing. In this figure we show the sleeve 11 directly confined by split rings 17ᵃ laid in the shaft 10. Bearing sleeve 11 is provided at its ends with means for limiting the longitudinal movement of the rollers, which means comprises the split rings 20 laid in annular grooves around the sleeve. The rollers 14ᶜ may be held endwise between these end rings. However, if it is so desired (and we illustrate this form in order to show how our sleeve feature facilitates such a construction) intermediate division rings 21 may be set in annular grooves around the sleeve, and the rollers 14ᶜ may be in sections separated by these intermediate division rings. The use of sectional rollers is an advantageous feature. A bearing of any desired length may be made by the simple expedient of using a suitable number of sections of rollers. And it will be seen very readily how such a sleeve as shown at 11 may be prepared with the annular grooves and then cut off in any desired length, with any number of sections, placed upon a shaft, and the desired numbers of sections of rollers put in place. And at the same time if at any time it is desired to use a single set of rollers rather than a number of sections, the division rings 21 may be removed and a single set of rollers put in place between the confining means at the ends of the sleeves. It will of course be understood that the other sleeves shown in the drawings may also be equipped with division rings in the same manner as shown in Fig. 5.

Generally speaking, it is an advantage of the sleeve construction that if the parts become worn or deteriorated in any manner, the sleeves and rollers may easily be replaced; or the sleeves alone may be replaced at a very small cost. In the practical use of our invention removable sleeves may be used both inside and outside of the rollers, or either inside or outside; and the division rings, or the end means which hold the sleeves and at the same time form limiting means for endwise movement of the rollers, may be applied either to the inside or the outside sleeve.

In Fig. 1 we show the application of our invention to a particular form of bearing adapted for use on the front wheels of automobiles, etc. Here the sleeve 11 around shaft 10 may be thicker than is shown in the other drawings, and the sleeve 12 outside the rollers 14 may either be a sleeve which is inserted in the hub structure of the wheel or may form a part of the hub structure itself. The roller limiting collars 15ᵃ and 15ᵇ may be provided in any suitable form. For instance, the one at the left in Fig. 1 is shown mounted upon the shaft 10 and having a reduced portion around which the inner periphery of the housing flange 30 more or less loosely fits, and having a flange 31 which projects radially beyond the outer surface of sleeve 11, to form an endwise limiting means for the rollers. The collar 15ᵇ at the right in Fig. 1 is shown mounted upon a reduced end portion 32 of sleeve 11. Otherwise it is the same as the collar 15ᵃ; having a similar reduced portion around which the inner periphery of the other housing collar 30 loosely fits (without forcibly touching or having any frictional contact with the collar), and having a flange 31 which forms the means for limiting endwise movement of the rollers. In all forms of the bearing the rollers are allowed a slight endwise play. These collars 15ᵃ and 15ᵇ are, as in the other designs herein illustrated separate from the sleeve. If a collar breaks it is not necessary to replace the sleeve or any other part.

Housing collars 30 preferably bear inwardly against shoulders 32ᵃ in the outer bearing member 12; and either one or both of these housing collars may be held in place by any suitable means, as by a small screw or screws 33. Where end thrust bearings are used the housing collars 30 become elements of those bearings. For instance, we may utilize bearing members 34 and 35 which carry end thrust balls 36 in annular ball races; and these balls 36 have bearing contact against the housing collars 30. At the same time the members 34 bear directly against collars 15ᵃ and 15ᵇ. In a typical construction the member 34 at the left may bear against a permanent collar or enlargement 37 of shaft 10 while the other bearing member 35 at the right may be confined by split rings 38 (or a nut or the like). This split ring holds member 35 up against collar 15ᵇ and holds that collar against sleeve 11, thus holding sleeve 11 up against collar 15ᵃ and collar 15ᵃ against the member 34 at the left, thus holding member 34 up against shoulder 37. The shoulder 37 is thus, as also the split ring 38, a means for holding the sleeve, and the sleeve holding collar in place. If no special bearings are used as end thrust bearings, the housing collars 30 may be in any case the end thrust members of the bearing. When all the parts are held in the positions illustrated, the collars 30 do not bear frictionally against collars 15ᵃ and 15ᵇ; there being a slight endwise freedom left which is taken up by the end thrust bearings which bear against the opposite outer faces of housing collars 30. These housing collars not only protect the bearing but become further the means of removing the whole bearing from the shaft 10 when so desired, without releasing rollers 14 and allowing them to fall out of proper position. When it is desired to remove the bearing from shaft 10, it is only necessary to take off the split ring 38. Member 35 may then be removed and then by pulling outwardly on outer bearing member 12, the whole bearing will be moved off shaft 10, sleeve 11 being preferably removably fitted to the shaft, the housing collar carrying collar 15ª outwardly with it, and the collar 15ª pushing the sleeve 11 along off the shaft. Consequently when the bearing is removed from the shaft, all of the parts will still be held in their relative proper positions and rollers 14 are not allowed to fall apart. This is an advantage in any bearing, and particularly in our bearing where no cages, etc., are used for the rollers and where the rollers would otherwise fall apart. We preferably use load carrying rollers 14 spaced apart by smaller spacer rollers 9 designed to roll between adjacent rollers 14 but not to rub on the inner or outer sleeves.

From the foregoing the essentials and fundaments of our invention may be readily understood. We have explained in some detail some of the particular forms which our bearing may take, but we do not mean to thereby limit ourselves to the particular forms herein described.

Having described a preferred form of our invention, we claim:

1. A roller bearing comprising an inner shaft, an outer annular member having an inner cylindrical bearing surface, a cylindrical bearing sleeve on the shaft, rollers between the outer member and the bearing sleeve, the bearing sleeve being removably fitted on the shaft, roller confining collars at the ends of the sleeve, means for holding said collars in place with reference to the shaft, and housing collars mounted in the outer bearing member and extending inwardly to points longitudinally outside the roller confining collars, affording means whereby the bearing sleeve with the rollers may all be removed from the shaft by longitudinal removal of the outer bearing member.

2. A roller bearing comprising an inner shaft, an outer annular member having an inner cylindrical bearing surface, a cylindrical bearing sleeve on the shaft, rollers between the outer member and the bearing sleeve, the bearing sleeve being removably fitted on the shaft, roller confining collars at the ends of the sleeve, means for holding said collars in place with reference to the shaft, and housing collars mounted in the outer bearing member and extending inwardly to points longitudinally outside the roller confining collars, and end thrust bearings on the shaft outside the housing collars and bearing inwardly against them.

3. A roller bearing comprising an inner shaft, an outer cylindrical bearing member, a cylindrical bearing sleeve removably fitted on the shaft, rollers between the sleeve and the outer member, roller confining collars fitted against the ends of the sleeve and extending radially beyond its outer surface, said collars having reduced parts which extend longitudinally of the shaft away from the sleeve, housing collars fitted into the ends of the outer bearing member and extending inwardly with their inner peripheries surrounding the reduced parts of the roller confining collars, end thrust bearing members mounted on the shaft and bearing longitudinally inwardly against the housing collars, and means to hold said end thrust bearing members inwardly toward each other, said members pressing against the roller confining collars.

4. A roller bearing comprising an inner shaft, an outer bearing member having an inner cylindrical bearing surface, a cylindrical bearing sleeve removably fitted on the shaft, rollers between the outer member and the bearing sleeve, roller confining collars at the ends of the bearing sleeve, means for holding the sleeve and collars in place on the shaft embodying a shoulder at one end and a removable collar at the other, and housing collars mounted in the outer bearing member and extending inwardly to points longitudinally outside the roller confining collars.

In witness that we claim the foregoing we have hereunto subscribed our names this 8th day of March, 1918.

LOWELL W. LYONS.
JOSEPH WILLS.

Witness:
  VIRGINIA I. BERINGER.